(12) United States Patent
Yu et al.

(10) Patent No.: US 12,602,845 B2
(45) Date of Patent: Apr. 14, 2026

(54) UNIVERSAL STATE REPRESENTATIONS OF VISUALIZATIONS FOR DIFFERENT TYPES OF DATA MODELS

(71) Applicant: SAP SE, Walldorf (DE)

(72) Inventors: Jie Yu, Port Moody (CA); Philip Kin Sung Lau, Richmond (CA); Yue Qian Huang, Burnaby (CA); Rui Liu, Richmond (CA)

(73) Assignee: SAP SE, Walldorf (DE)

( * ) Notice: Subject to any disclaimer, the term of this patent is extended or adjusted under 35 U.S.C. 154(b) by 173 days.

(21) Appl. No.: 18/463,163

(22) Filed: Sep. 7, 2023

(65) Prior Publication Data

US 2024/0420390 A1    Dec. 19, 2024

Related U.S. Application Data

(60) Provisional application No. 63/508,773, filed on Jun. 16, 2023.

(51) Int. Cl.
*G06T 11/23* (2026.01)
(52) U.S. Cl.
CPC .......... *G06T 11/23* (2026.01); *G06T 2200/24* (2013.01)
(58) Field of Classification Search
None
See application file for complete search history.

(56) References Cited

U.S. PATENT DOCUMENTS

| | | | |
|---|---|---|---|
| 10,262,048 B1* | 4/2019 | Cappiello | ............... G06F 16/26 |
| 2008/0120268 A1* | 5/2008 | Ruiz | ..................... G06F 16/972 |
| 2015/0088902 A1* | 3/2015 | Nilsson | ............... G06F 16/2272 |
| | | | 707/756 |
| 2018/0174337 A1* | 6/2018 | Menard | .................. G06T 11/206 |
| 2018/0181657 A1* | 6/2018 | Giardina | ............... G06F 16/248 |
| 2022/0114178 A1* | 4/2022 | Haprian | ........... G06F 16/24539 |
| 2025/0028639 A1* | 1/2025 | Wang | .................. G06F 12/0802 |

* cited by examiner

*Primary Examiner* — Jeffrey J Chow
(74) *Attorney, Agent, or Firm* — Fountainhead Law Group, PC

(57) ABSTRACT

Some embodiments provide a non-transitory machine-readable medium that stores a program. The program may receive a first selection of a data model as a data source for a visualization, wherein the data model specifies data to be organized according to a set of measures and a set of dimensions. The program may receive a second selection of a dimension value for a dimension in the set of dimensions, wherein each measure in the set of measures is a particular dimension value for the dimension. The program may in response to the second selection, generating a state representation of the visualization that includes the selected dimension value for the dimension. The program may generate the visualization based on the state representation of the visualization.

20 Claims, 12 Drawing Sheets

800

Receiving a first selection of a data model as a data source for a visualization, wherein the data model specifies data to be organized according to a set of measures and a set of dimensions — 810

Receiving a second selection of a dimension value for a dimension in the set of dimensions, wherein each measure in the set of measures is a particular dimension value for the dimension — 820

In response to the second selection, generating a state representation of the visualization that includes the selected dimension value for the dimension — 830

Generating the visualization based on the state representation of the visualization — 840

200

| Product | Account Dimension | Account Value |
|---------|-------------------|---------------|
| Shoes | Income | 100 |
| Shirts | Expense | -100 |
| Shoes | Expense | -50 |
| Shirts | Income | 0 |

300

| Product | Account Dimension | CustomDimension1 | |
|---------|-------------------|------------------|------------------|
| | | CD1 Amount | CD1 Amount EUR |
| Shoes | Income | 100 | 200 |
| Shoes | Expense | -50 | -100 |
| Shirts | Expense | -100 | -200 |
| Shirts | Income | 0 | 0 |

400

| Product | CustomDimension1 | |
|---------|------------------|------------|
| | CD1 Income | CD1 Expense |
| Shoes | 100 | -50 |
| Shirts | 0 | -100 |

800

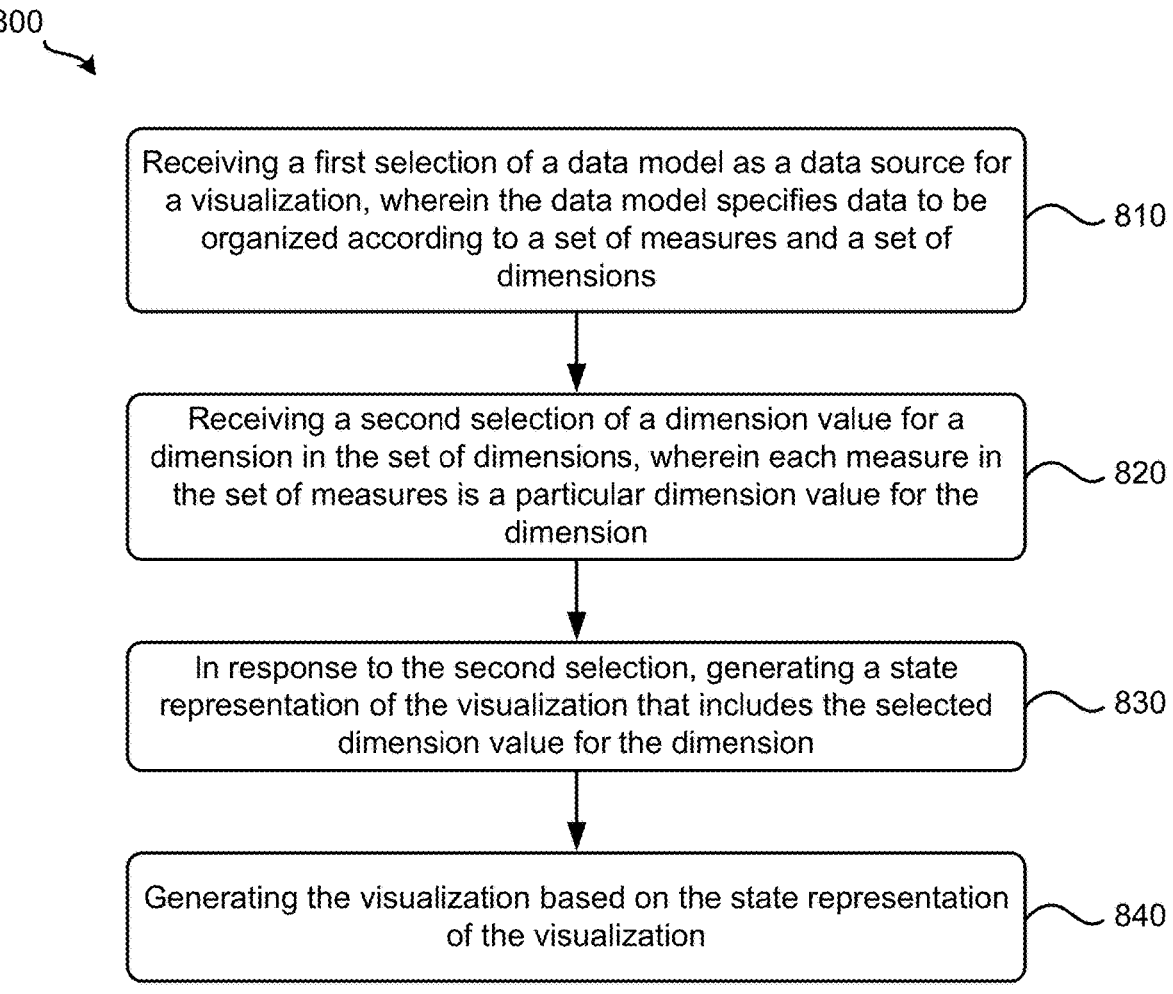

Receiving a first selection of a data model as a data source for a visualization, wherein the data model specifies data to be organized according to a set of measures and a set of dimensions — 810

Receiving a second selection of a dimension value for a dimension in the set of dimensions, wherein each measure in the set of measures is a particular dimension value for the dimension — 820

In response to the second selection, generating a state representation of the visualization that includes the selected dimension value for the dimension — 830

Generating the visualization based on the state representation of the visualization — 840

FIG. 8

UNIVERSAL STATE REPRESENTATIONS OF VISUALIZATIONS FOR DIFFERENT TYPES OF DATA MODELS

CROSS-REFERENCE TO RELATED APPLICATION

The present application claims the benefit and priority of U.S. Provisional Application No. 63/508,773, filed Jun. 16, 2023, entitled "Consolidation of Model Handling and Code Paths Across Model Types," the entire contents of which are incorporated herein by reference in its entirety for all purposes.

BACKGROUND

Data models are abstract representations of how data is structured, organized, and related within a database or information system. They can serve as a blueprint for designing, implementing, and managing data, enabling efficient data manipulation, storage, and retrieval. Data models help ensure data consistency, integrity, and accuracy while providing an understanding of the data. Different types of data models provide different levels of abstraction and focus on different aspects of data organization. Examples of types of data models include conceptual data models, logical data models, physical data models, hierarchical data models, network data models, relational data models, object-oriented data models, entity-relationship data models, etc.

SUMMARY

In some embodiments, the techniques described herein relate to a non-transitory machine-readable medium storing a program executable by at least one processing unit of a device, the program including sets of instructions for: receiving a first selection of a data model as a data source for a visualization, wherein the data model specifies data to be organized according to a set of measures and a set of dimensions; receiving a second selection of a dimension value for a dimension in the set of dimensions, wherein each measure in the set of measures is a particular dimension value for the dimension; in response to the second selection, generating a state representation of the visualization that includes the selected dimension value for the dimension; and generating the visualization based on the state representation of the visualization.

In some embodiments, the techniques described herein relate to a non-transitory machine-readable medium, wherein the generated visualization includes measure values for a measure in the set of measures that corresponds to the selected dimension value for the dimension.

In some embodiments, the techniques described herein relate to a non-transitory machine-readable medium, wherein the program further includes sets of instructions for: receiving a third selection of a dimension value for a second dimension in the set of dimensions, wherein each measure in a second set of measures of the data model is a particular dimension value for the second dimension; and in response to the third selection, updating the state representation of the visualization to further include the selected dimension value for the second dimension.

In some embodiments, the techniques described herein relate to a non-transitory machine-readable medium, wherein generating the visualization based on the state representation of the visualization includes generating a query based on the state representation; sending the query to a computing system; receiving, from the computing system, a result set of data for the query; and rendering the visualization to include the result set of data.

In some embodiments, the techniques described herein relate to a non-transitory machine-readable medium, wherein the program further includes sets of instructions for: receiving a third selection of the visualization; in response to receiving the third selection, generating a tool for building the visualization based on the state representation of the visualization; and providing the tool in a graphical user interface (GUI).

In some embodiments, the techniques described herein relate to a non-transitory machine-readable medium, wherein the data model is a first data model, wherein the data source for the visualization is a first data source for a first visualization, wherein the data is a first data, wherein the set of measures is a first set of measures, wherein the set of dimensions is a first set of dimensions, wherein the state representation is a first state representation, wherein the program further includes sets of instructions for: receiving a third selection of a second data model as a second data source for a second visualization, wherein the second data model specifies data to be organized according to a second set of measures and a second set of dimensions; receiving a fourth selection of a dimension value for a dimension in the second set of dimensions, wherein each measure in the second set of measures is a particular dimension value for the dimension in the second set of dimensions; in response to the fourth selection, generating a second state representation of the second visualization that includes the selected dimension value for the dimension in the second set of dimensions; and generating the second visualization based on the second state representation of the second visualization.

In some embodiments, the techniques described herein relate to a non-transitory machine-readable medium, wherein a first structure of the first state representation for the first visualization and a second structure of the second state representation for the second visualization are the same.

In some embodiments, the techniques described herein relate to a method including: receiving a first selection of a data model as a data source for a visualization, wherein the data model specifies data to be organized according to a set of measures and a set of dimensions; receiving a second selection of a dimension value for a dimension in the set of dimensions, wherein each measure in the set of measures is a particular dimension value for the dimension; in response to the second selection, generating a state representation of the visualization that includes the selected dimension value for the dimension; and generating the visualization based on the state representation of the visualization.

In some embodiments, the techniques described herein relate to a method, wherein the generated visualization includes measure values for a measure in the set of measures that corresponds to the selected dimension value for the dimension.

In some embodiments, the techniques described herein relate to a method further including receiving a third selection of a dimension value for a second dimension in the set of dimensions, wherein each measure in a second set of measures of the data model is a particular dimension value for the second dimension; and in response to the third selection, updating the state representation of the visualization to further include the selected dimension value for the second dimension.

In some embodiments, the techniques described herein relate to a method, wherein generating the visualization based on the state representation of the visualization includes generating a query based on the state representation; sending the query to a computing system; receiving, from the computing system, a result set of data for the query; and rendering the visualization to include the result set of data.

In some embodiments, the techniques described herein relate to a method further including receiving a third selection of the visualization; in response to receiving the third selection, generating a tool for building the visualization based on the state representation of the visualization; and providing the tool in a graphical user interface (GUI).

In some embodiments, the techniques described herein relate to a method wherein the data model is a first data model, wherein the data model is a first data model, wherein the data source for the visualization is a first data source for a first visualization, wherein the data is a first data, wherein the set of measures is a first set of measures, wherein the set of dimensions is a first set of dimensions, wherein the state representation is a first state representation, the method further including: receiving a third selection of a second data model as a second data source for a second visualization, wherein the second data model specifies data to be organized according to a second set of measures and a second set of dimensions; receiving a fourth selection of a dimension value for a dimension in the second set of dimensions, wherein each measure in the second set of measures is a particular dimension value for the dimension in the second set of dimensions; in response to the fourth selection, generating a second state representation of the second visualization that includes the selected dimension value for the dimension in the second set of dimensions; and generating the second visualization based on the second state representation of the second visualization.

In some embodiments, the techniques described herein relate to a method, wherein a first structure of the first state representation for the first visualization and a second structure of the second state representation for the second visualization are the same.

In some embodiments, the techniques described herein relate to a system including: a set of processing units; and a non-transitory machine-readable medium storing instructions that when executed by at least one processing unit in the set of processing units cause the at least one processing unit to: receive a first selection of a data model as a data source for a visualization, wherein the data model specifies data to be organized according to a set of measures and a set of dimensions; receive a second selection of a dimension value for a dimension in the set of dimensions, wherein each measure in the set of measures is a particular dimension value for the dimension; in response to the second selection, generate a state representation of the visualization that includes the selected dimension value for the dimension; and generate the visualization based on the state representation of the visualization.

In some embodiments, the techniques described herein relate to a system, wherein the generated visualization includes measure values for a measure in the set of measures that corresponds to the selected dimension value for the dimension.

In some embodiments, the techniques described herein relate to a system, wherein the instructions further cause the at least one processing unit to: receive a third selection of a dimension value for a second dimension in the set of dimensions, wherein each measure in a second set of measures of the data model is a particular dimension value for the second dimension; and in response to the third selection, update the state representation of the visualization to further include the selected dimension value for the second dimension.

In some embodiments, the techniques described herein relate to a system, wherein generating the visualization based on the state representation of the visualization includes generating a query based on the state representation; sending the query to a computing system; receiving, from the computing system, a result set of data for the query; and rendering the visualization to include the result set of data.

In some embodiments, the techniques described herein relate to a system, wherein the instructions further cause the at least one processing unit to: receive a third selection of the visualization; in response to receiving the third selection, generate a tool for building the visualization based on the state representation of the visualization; and provide the tool in a graphical user interface (GUI).

In some embodiments, the techniques described herein relate to a system, wherein the data model is a first data model, wherein the data source for the visualization is a first data source for a first visualization, wherein the data is a first data, wherein the set of measures is a first set of measures, wherein the set of dimensions is a first set of dimensions, wherein the state representation is a first state representation, wherein the instructions further cause the at least one processing unit to: receive a third selection of a second data model as a second data source for a second visualization, wherein the second data model specifies data to be organized according to a second set of measures and a second set of dimensions; receive a fourth selection of a dimension value for a dimension in the second set of dimensions, wherein each measure in the second set of measures is a particular dimension value for the dimension in the second set of dimensions; in response to the fourth selection, generate a second state representation of the second visualization that includes the selected dimension value for the dimension in the second set of dimensions; and generate the second visualization based on the second state representation of the second visualization.

The following detailed description and accompanying drawings provide a better understanding of the nature and advantages of various embodiments of the present disclosure.

BRIEF DESCRIPTION OF THE DRAWINGS

FIG. 8 illustrates a process for providing a universal state representation of a visualization according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for providing universal state representations of visualizations for different types of data models. In some embodiments, a system includes a client device and a computing system. A user of the client device may request for visualizations of data managed by the computing system. The data used for the visualizations can be organized according to measures and dimensions. In response to one of these requests, the client device sends computing system a query for the underlying data for the visualization and sends it to the computing system. When the computing system receives the query, the computing system retrieves the requested data and sends it back to the client device. The client device uses the data to render the visualization and provide it to the user.

When the user of the client device configures a visualization, the client device generates a state representation of the visualization. If the user of the client device modifies the configuration of the visualization, the client device updates the state representation of the visualization to reflect the modifications. The data used in the visualizations may be organized according to any number of different types of data models. Regardless of the type of data model employed, the same structure is used for the state representations of visualizations. This allows high reuse of programming code because the state representations of visualizations can be treated the same. No special handling is required for different types of data models.

The techniques described in the present application provide a number of benefits and advantages over conventional methods for managing state representations of visualizations. For example, using the same structure for the state representations of visualizations of different types of data models facilitates faster processing and reduced resource utilization on client devices. Conventional methods for managing state representations of visualizations may use different structures of state representations for different types of data models. As a result, these conventional methods would require disparate special handling for the different types of data models and, thus, utilize additional resources (e.g., memory, processing, etc.) than the techniques described herein.

Figure 1:
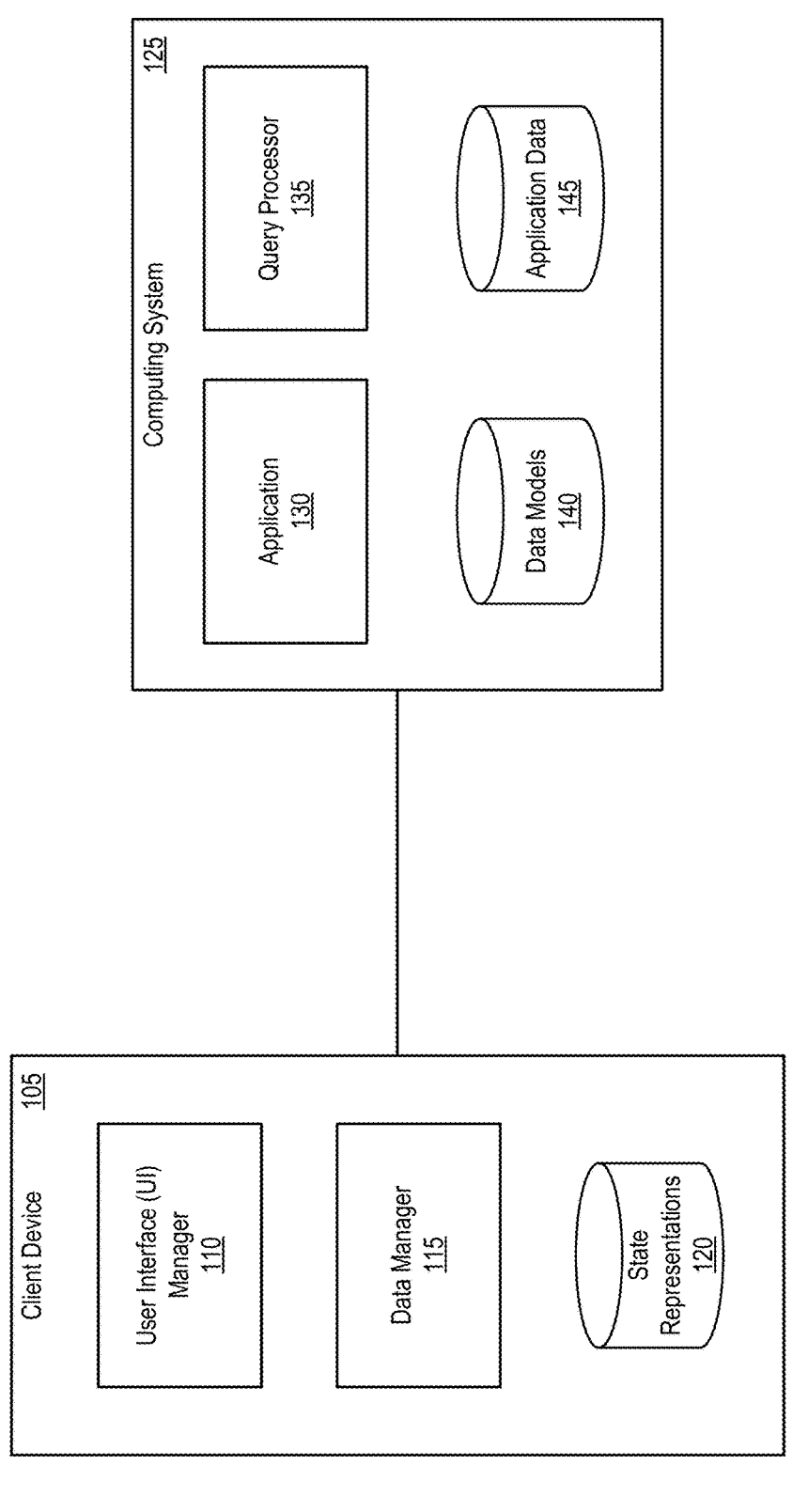
FIG. 1 illustrates a system for providing universal state representations of visualizations for different types of data models according to some embodiments.

FIG. 1 illustrates a system for providing universal state representations of visualizations for different types of data models according to some embodiments. As shown, system 100 includes client device 105 and computing system 125. Client device 105 is configured to interact with computing system 125. As depicted in FIG. 1, client device 105 includes user interface (UI) manager 110, data manager 115, and state representations storage 120. State representations storage 120 stores state representations of visualizations. In some embodiments, a state representation of a visualization is a data structure that represents the state of a visualization in terms of the data to be used to render the visualization.

UI manager 110 is responsible for managing a graphical user interface (GUI) provided on client device 105 (e.g., displayed on a display of client device 105). For instance, UI manager 110 may receive a GUI from application 130, which UI manager 110 provides on client device 105 (e.g., displays on a display of client device 105). Additionally, UI manager 110 may be configured to manage user input received through the GUI. For example, when UI manager 110 detects user input indicating a modification to a visualization in a manner that changes the underlying data of the visualization, UI manager 110 forwards the user input to data manager 115. In return, UI manager 110 may receive from data manager 115 a set of new data for the visualization. In response to receiving the new data, UI manager 110 updates the visualization with the new data.

Data manager 115 is configured to manage data for visualizations provided on client device 105. For instance, data manager 115 may receive from UI manager 110 user input indicating a modification to a visualization that effects the underlying data of the visualization, data manager 115 accesses state representations storage 120 to retrieve a state representation of the visualization. If no state representation exists, data manager 115 generates one and stores it in state representations storage 120. Based on the user input, data manager 115 modifies the state representation of the visualization so that the state representation of the visualization reflects the modification to the underlying data of the visualization. Next, data manager 115 generates a query based on the state representation of the visualization. Data manager 115 then sends the generated query to computing system 125. In return, data manager 115 receives from computing system 125 a set of new data for the visualization. Data manager 115 forwards the set of new data to UI manager 110.

As illustrated in FIG. 1, computing system 125 includes application 130, query processor 135, data models storage 140, and application data storage 145. Data models storage 140 is configured to store data models. In some embodiments, a data model defines how elements of data are to be organized. Any number of different types of data models can be used to organize data. For example, one type of data model defines data to be organized according to measures and dimensions. In some embodiments, a measure is a field that is configured to store quantitative (e.g., numeric) data whereas a dimension is a field that is configured to store qualitative data. Values stored in a measure can be referred to as measure values and values stored in dimensions can be referred to as dimension values. In some embodiments, a dimension is configured to categorize measures based on the dimension values of the dimension. Application data storage 145 stores data generated by, accessed by, associated with, etc., application 130. In some cases, such data is organized according to a data model in data models storage 140.

In some embodiments, data models storage 140) and application data storage 145 are implemented in a single physical storage while, in other embodiments, data models storage 140 and application data storage 145 may be implemented across several physical storages. While FIG. 1 shows data models storage 140 and application data storage 145 as part of computing system 125, one of ordinary skill in the art will appreciate that data models storage 140 and/or application data storage 145 may be external to computing system 125 in some embodiments.

Application 130 is a software application operating on computing system 125 configured to interact with client device 105. For example, application 130 may provide, via a GUI, visualizations of data to client device 105. Through the GUI, application 130 can receive queries for different data for the visualizations. Upon receiving such a query, application 130 sends it to query processor 135 for processing. When application 130 receives the requested data from query processor 135, application 130 provides, via the GUI, the data to client device 105.

Query processor 135 handles the processing of queries. For instance, query processor 135 may receive a query from application 130. In response, query processor 135 executes the query represented by the query model by accessing application data storage 145 and retrieving the data specified in the query. Once query processor 135 finishes executing the query, query processor 135 sends application 130 the retrieved data.

Figure 2:
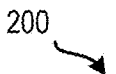
FIG. 2 illustrates data organized according to a first type of data model according to some embodiments.
Figure 3:
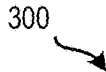
FIG. 3 illustrates data organized according to a second type of data model according to some embodiments.
Figure 4:
FIG. 4 illustrates data organized according to a third type of data model according to some embodiments.

Three example operations will now be described by reference to FIGS. 1-7. FIGS. 2-4 illustrate examples of different types of data models used in the three example operations. FIG. 2 illustrates data 200 organized according to a first type of data model according to some embodiments. As depicted in FIG. 2, data 200 is a table that includes three columns: a product column, an account dimension column, and an account value column. The product column is configured to store dimension values for a product dimension. The account dimension values stores dimension values for an account dimension. Each dimension value for the account dimension represents a measure. For this example, the measures are an income measure and an expense measure. The account value column is configured to store measure values of the measures.

FIG. 3 illustrates data 300 organized according to a second type of data model according to some embodiments. As shown, data 300 is a table that includes four columns: a product column, an account dimension column, a customdimension1 (CD1) amount column, and a CD1 amount EUR column. The product column stores dimension values for a product dimension. The account dimension values is configured to store dimension values for an account dimension. Each dimension value for the account dimension represents a measure. In this example, the measures are an income measure and an expense measure. The CD1 amount column stores measure values for an amount measure. The CD1 amount EUR column is configured to store equivalent measure values for the amount measure in terms of Euros (EUR). The CD1 amount column and the CD1 amount EUR column are members of a CustomDimension1 dimension. That is, CD1 amount and CD1 amount EUR are dimension values for the CustomDimension1 dimension.

FIG. 4 illustrates data 400 organized according to a third type of data model according to some embodiments. As illustrated, data 400 is a table that includes three columns: a product column, a CD1 income column, and a CD1 expense column. The product column stores dimension values for a product dimension. The CD1 income column is configured to store measure values for a CD1 income measure. The CD1 expense column stores measure values for a CD1 expense measure, account dimension values stores dimension values for an account dimension. The CD1 income column and the CD1 expense column are members of a CustomDimension1 dimension. In other words, CD1 income and CD1 expense are dimension values for the CustomDimension1 dimension.

Figure 5A:
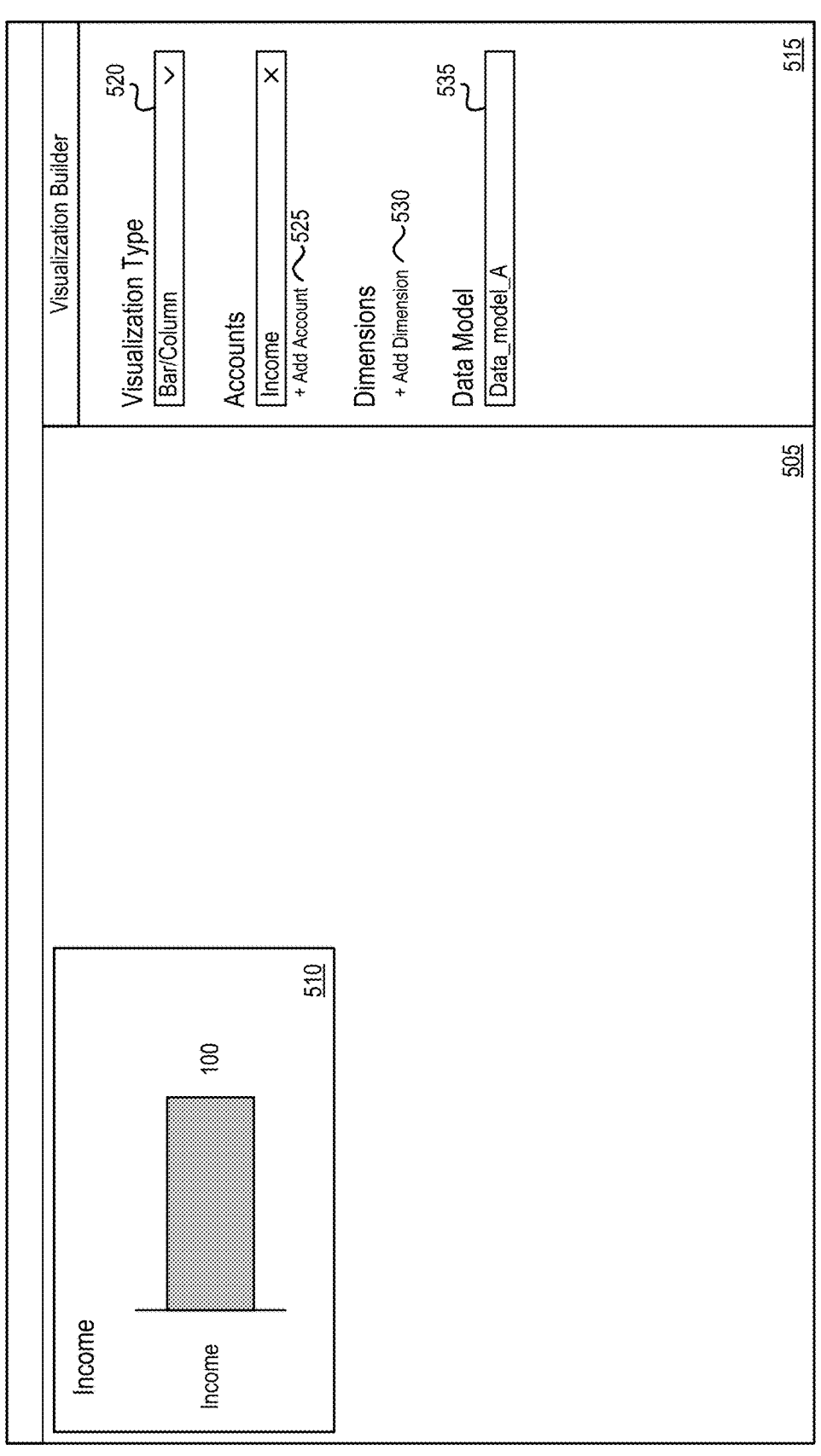
FIGS. 5A and 5B illustrate an example of generating a state representation for the type of data model illustrated in FIG. 2 according to some embodiments.

The first example operation demonstrates how a state representation of a visualization is generated based on the first type of data model shown in FIG. 2. The example begins with a user of client device 105 configuring a visualization that uses data 200. FIG. 5A illustrates GUI 500 for configuring a visualization according to some embodiments. For this example, application 130 provides GUI 500 to client device 105, which, in turn, provides GUI 500 (e.g., on a display of client device 105) to the user of client device 105. As shown in FIG. 5A, GUI 500 includes display area 505 and display area 515. Display area 505 is configured to display visualizations of data. Display area 515 is for providing a tool for building visualizations. As depicted, display area 515 includes UI controls 520-535. UI control 520 is a selectable a drop-down list control for selecting a type of visualization. UI control 525 is a selectable UI element for adding a dimension value for an account dimension to a visualization. UI control 530 is a selectable UI element for adding a dimension to the visualization. UI control 535 is a selectable UI element for selecting a data model as a data source for the visualization.

In this example, the user of client device 105 has used UI control 535 to select the data model (Data_model_A) used to organize data 200 as the data source for a visualization. In addition, the user of client device 105 has used UI control 520 to select a Bar/Column type of visualization for the visualization. The user of client device 105 has also used UI control 525 to add the income measure, which is a dimension value for the account dimension, to the visualization. The configured visualization in this first example is illustrated as visualization 510 in display area 505 of FIG. 5A. Here, visualization 510 is a visualization that displays a bar chart of the income data shown in data 200.

After the user of client device 105 adds the income measure, UI manager 110 determines that the user input indicates a modification to visualization 510 in a manner that changes the underlying data of visualization 510. Therefore, UI manager 110 forwards the user input to data manager 115. Upon receiving the user input, data manager 115 accesses state representations storage 120 to retrieve a state representation of visualization 510. Since no state representation exists yet, data manager 115 generates a state representation for visualization 510 and stores it in state representations storage 120.

Figure 5B:
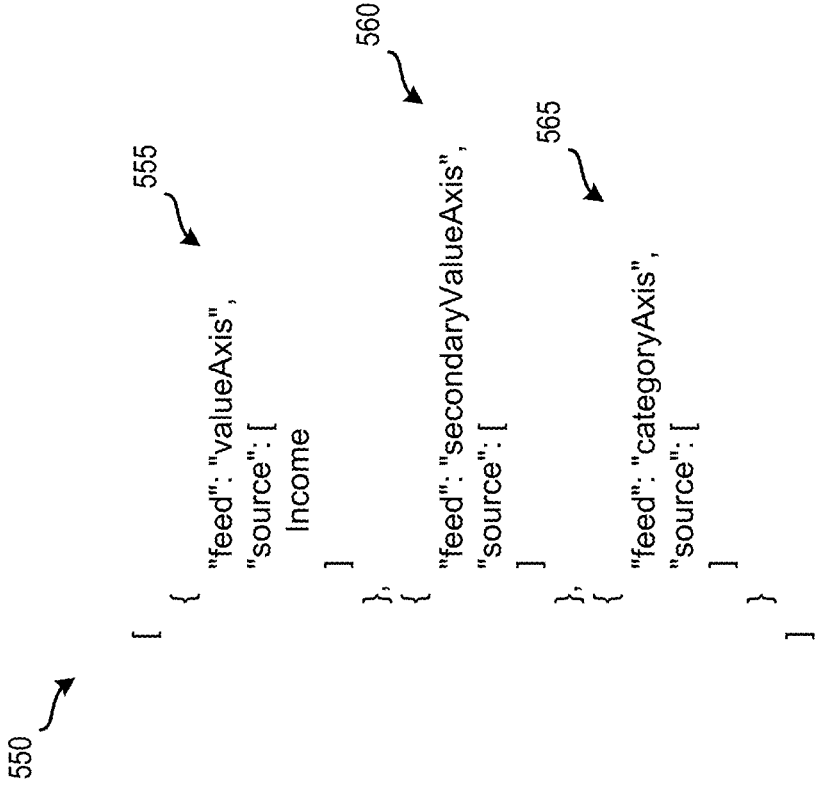

FIG. 5B illustrates state representation 550 according to some embodiments. Specifically, state representation 550 is the state representation for visualization 510 that data manager 115 generates in this example. As shown, state representation 550 includes three sections 555-565. Section 555 is for storing dimension values for a first dimension. Each dimension value for the first dimension represents a measure. Section 560 stores dimension values for a second dimension. Each dimension value for the second dimension represents a measure. Section 565 is configured to store the second dimension. When data is modeled like the data illustrated in data 200 (e.g., the data model includes an account dimension that has dimension values representing measures), data manager 115 determines that the first dimension is the account dimension. Since the user of client device 105 selected the income dimension value for this example, data manager 115 stores "Income" in section 555 of state representation 550.

Figure 6A:
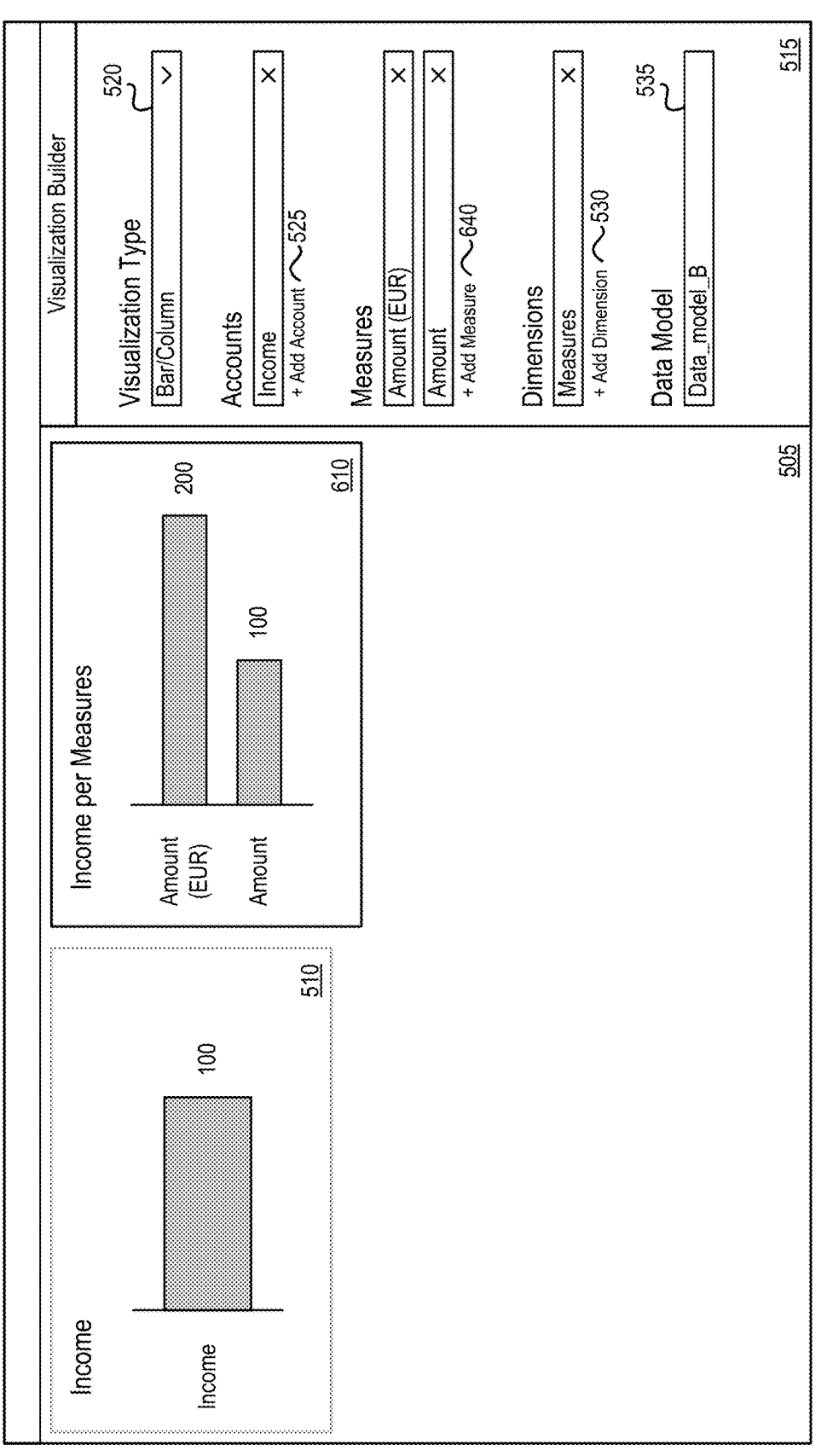
FIGS. 6A and 6B illustrate an example of generating a state representation for the type of data model illustrated in FIG. 3 according to some embodiments.

A second example operation shows how a state representation of a visualization is generated based on the second type of data model shown in FIG. 3. The second example type of data model shown in FIG. 3. The second example operation starts with a user of client device 105 configuring a visualization that uses data 300. FIG. 6A illustrates GUI 500 for configuring a visualization according to some embodiments. GUI 500 in FIG. 6A is the same as GUI 500 in FIG. 5A except display area 515 (e.g., the tool for building visualizations) also includes UI control 640. UI control 640 is a selectable UI element for adding a measure value for a dimension specified using UI control 530.

For this example, the user of client device 105 has used UI control 535 to select the data model (Data_model_B) used to organize data 300 as the data source for a visualization. The user of client device 105 has also used UI control 520 to select a Bar/Column type of visualization for the visualization. Additionally, the user of client device 105 has used UI control 525 to add the income measure, which is a dimension value for the account dimension, to the visualization. The user of client device 105 has used UI control 530 to add to the CustomDimension1 dimension (labeled as "Measures" in this example) to the visualization. Lastly, the user of client device 105 has used UI control 640 to add the amount measure and the amount (EUR) measure, which are dimension values for the CustomDimension1 dimension, to the visualization. The configured visualization for this second example is illustrated as visualization 610 in display area 505 of FIG. 6A. As illustrated, visualization 610 is a visualization that displays a bar chart of the income data in data 300 for the amount measure and the amount (EUR) measure.

Once the user of client device 105 adds the income measure, UI manager 110 determines that the user input indicates a modification to visualization 610 in a manner that changes the underlying data of visualization 610. Hence, UI manager 110 forwards the user input to data manager 115. In response to receiving the user input, data manager 115 accesses state representations storage 120 to retrieve a state representation of visualization 610. As no state representation exists for visualization 610, data manager 115 generates a state representation for visualization 610 and stores it in state representations storage 120. Each time the user of client device 105 modifies visualization 610 (e.g., adding a dimension using UI control 530, adding a measure using UI control 640, etc.) that changes the underlying data of visualization 610, UI manager 110 forwards the user input to data manager 115 and data manager 115 accesses state representations storage 120 to modify the state representation of visualization 610 to reflect the modification to visualization 610.

Figure 6B:
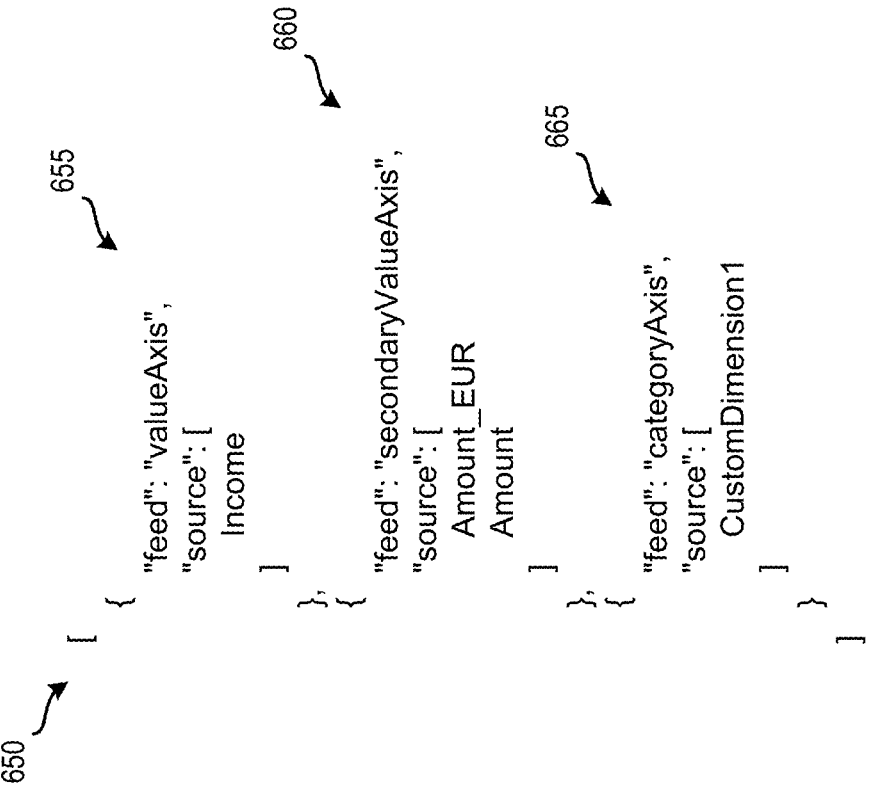

FIG. 6B illustrates state representation 650 according to some embodiments. In particular, state representation 650 is the state representation for visualization 610 that data manager 115 generates in this example. As illustrated, state representation 650) includes three sections 655-665. Section 655 stores dimension values for a first dimension. Each dimension value for the first dimension represents a measure. Section 660 is configured to store dimension values for a second dimension. Each dimension value for the second dimension represents a measure. Section 665 stores the second dimension. When data is modeled like the data shown in data 300 (e.g., the data model includes an account dimension that has dimension values representing measures), data manager 115 determines that the first dimension is the account dimension. Because the user of client device 105 selected the income dimension value for this example, data manager 115 stores "Income" in section 655 of state representation 650. The user of client device 105 also selected the CustomDimension1 as a second dimension and the amount and amount (EUR) dimension values for the second dimension. Thus, data manager 115 stores "CustomDimension1" in section 665 and stores "Amount_EUR" and "Amount" in section 660.

Figure 7A:
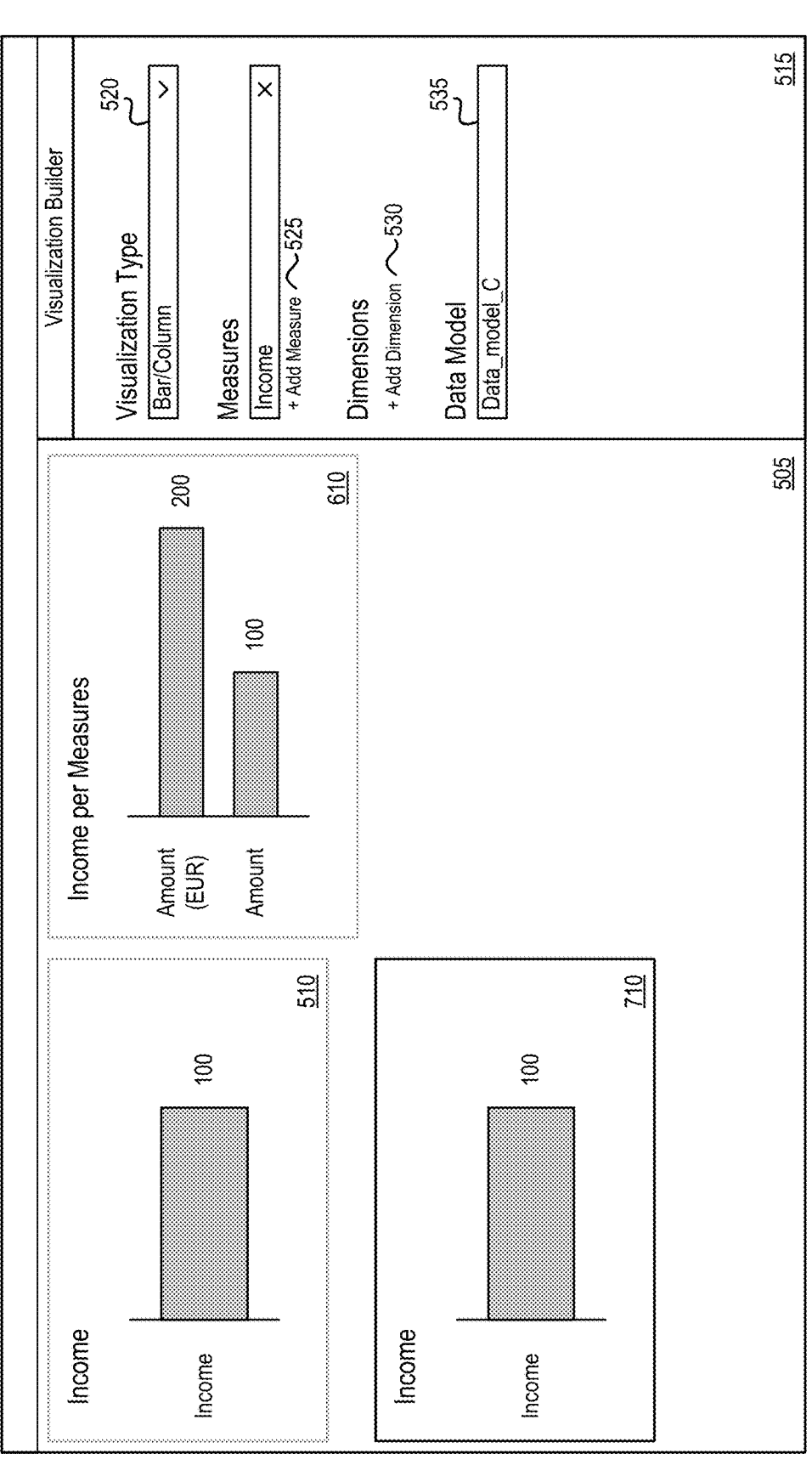
FIGS. 7A and 7B illustrate an example of generating a state representation for the type of data model illustrated in FIG. 4 according to some embodiments.

The third example operation demonstrates how a state representation of a visualization is generated based on the third type of data model shown in FIG. 4. The example begins by a user of client device 105 configuring a visualization that uses data 400. FIG. 7A illustrates GUI 500 for configuring a visualization according to some embodiments. GUI 500 in FIG. 7A is the same as GUI 500 in FIG. 5A.

In this example, the user of client device 105 has used UI control 535 to select the data model (Data_model_C) used to organize data 400 as the data source for a visualization. In addition, the user of client device 105 has used UI control 520 to select a Bar/Column type of visualization for the visualization. The user of client device 105 has also used UI control 525 to add the income measure, which is a dimension value for the CustomDimension1 dimension, to the visualization. The configured visualization in this third example is illustrated as visualization 710 in display area 505 of FIG. 7A. Here, visualization 710 is a visualization that displays a bar chart of the income data shown in data 400.

Upon the user of client device 105 adding the income measure, UI manager 110 determines that the user input indicates a modification to visualization 710 in a manner that changes the underlying data of visualization 710. As such, UI manager 110 forwards the user input to data manager 115. When data manager 115 receives the user input, data manager 115 accesses state representations storage 120 to retrieve a state representation of visualization 710. In this case no state representation exists yet so data manager 115 generates a state representation for visualization 710 and stores it in state representations storage 120.

Figure 7B:
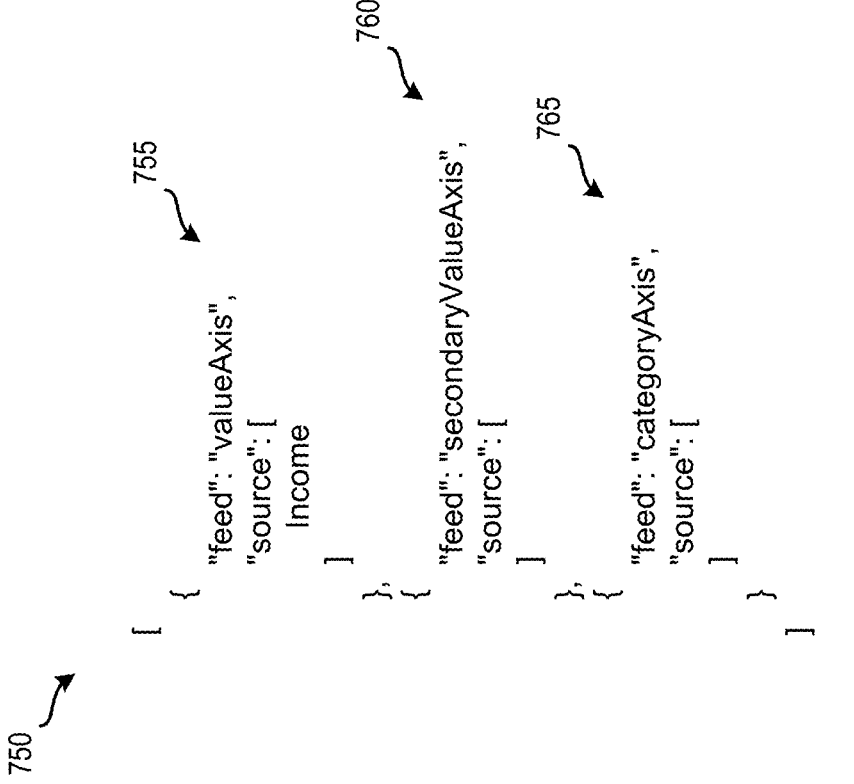

FIG. 7B illustrates state representation 750 according to some embodiments. Specifically, state representation 750 is the state representation for visualization 710 that data manager 115 generates in this example. As depicted in FIG. 7B, state representation 750 includes three sections 755-765. Section 755 is for storing dimension values for a first dimension. Each dimension value for the first dimension represents a measure. Section 760 stores dimension values for a second dimension. Each dimension value for the second dimension represents a measure. Section 765 is configured to store the second dimension. When data is modeled like the data illustrated in data 400 (e.g., the data model does not include an account dimension that has dimension values representing measures), data manager 115 determines that the first dimension is the CustomDimension1 dimension. Because the user of client device 105 selected the income dimension value for this example, data manager 115 stores "Income" in section 755 of state representation 750.

In each of the three example operations described above, after generating the state representation for the visualization, data manager 115 generates a query based on the state representation of the visualization. Data manager 115 then sends the generated query to application 130, which forwards it to query processor 135. In response to receiving the query, query processor 135 processes the query by accessing application data storage 145 to retrieve a set of data specified in the query. Then, query processor 135 sends the requested set of data to application 130, which forwards it to data manager 115. Data manager 115 sends the set of data to UI manager 110, which renders the visualization with the set of data (e.g., visualization 510, visualization 610, and visualization 710).

As depicted in FIGS. 5B, 6B, and 7B, the state representations of visualizations that utilize data from different types of data models employ the same structure. Specifically, each of the state representations 550, 650, and 750 includes the same three sections: a first section for specifying dimension values for a first dimension that represent measures, a section for specifying dimension values for a second dimension that represent measures, and a third section for specifying the second dimension. Different data (e.g., measures, dimensions, etc.) are stored in different sections depending on the structure of the data model. In this manner, a universal state representation can be used to store the state of visualizations of data regardless of the data model used to organize the data. Advantageously, this provides uniform consumption of the state representations of visualizations. Any consumer that requires the state representation of a visualization can treat everything the same regardless of the type of data model used. The tool for building visualizations provided in display area 515 of FIGS. 5A, 6A, and 7A is one such consumer. When a user of client device 105 selects an existing visualization (e.g., visualization 510, visualization 610, and visualization 710), UI manager 110 accesses state representations storage 120 to retrieve the state representation associated with the visualization. Then, UI manager 110 reads the state representation of the visualization in order to load the current selected parameters into the tool for building visualizations and display it in display area 515. Each section in a state representation can map 1 to 1 to a user interface (UI) element. Because the state representation is structurally the same across the types of data model, the same UI component can be reused. Referring to FIG. 7A as an example, if the user of client device 105 selects visualization 510, UI manager 110 would read state representation 550 of visualization 510. Based on state representation 550, UI manager 110 would load the tool for building visualization as it is shown in FIG. 5A. Similarly, if the user of client device 105 selects visualization 610, UI manager 110 would read state representation 650 of visualization 610. Based on state representation 650, UI manager 110 would load the tool for building visualization as it is shown in FIG. 6A.

FIG. 8 illustrates a process 800 for providing a universal state representation of a visualization according to some embodiments. In some embodiments, client device 105 performs process 800. Process 800 starts by receiving, at 810, a first selection of a data model as a data source for a visualization. The data model specifies data to be organized according to a set of measures and a set of dimensions. Referring to FIGS. 1, 2, and 5A, UI manager 110 can receive a selection of the data model used to organize data 200 (data_model_A) via UI control 535.

Next, process 800 receives, at 820, a second selection of a dimension value for a dimension in the set of dimensions. Each measure in the set of measures is a particular dimension value for the dimension. Referring to FIGS. 1, 2, and 5A as an example, UI manager 110 can receive a selection of the income dimension value for the account dimension. The income dimension value represent a measure.

In response to the second selection, process 800 generates, at 830, a state representation of the visualization that includes the selected dimension value for the dimension. Referring to FIGS. 1 and 5B as an example, data manager 115 receives the user input from UI manager 110. Next, data manager 115 accesses state representations storage 120 to retrieve a state representation of visualization 510. As the state representation for visualization 510 does not exist yet, data manager 115 generates state representation 550 for visualization 510 and stores it in state representations storage 120.

Finally, process 800 generates, at 840, the visualization based on the state representation of the visualization. Referring to FIGS. 1 and 5A as an example, after generating the state representation for the visualization, data manager 115 generates a query based on the state representation of the visualization. Data manager 115 then sends the generated query to application 130, which forwards it to query processor 135. In response to receiving the query, query processor 135 processes the query by accessing application data storage 145 to retrieve a set of data specified in the query. Then, query processor 135 sends the requested set of data to application 130, which forwards it to data manager 115. Data manager 115 sends the set of data to UI manager 110, which renders visualization 510, as depicted in FIG. 5A.

Figure 9:
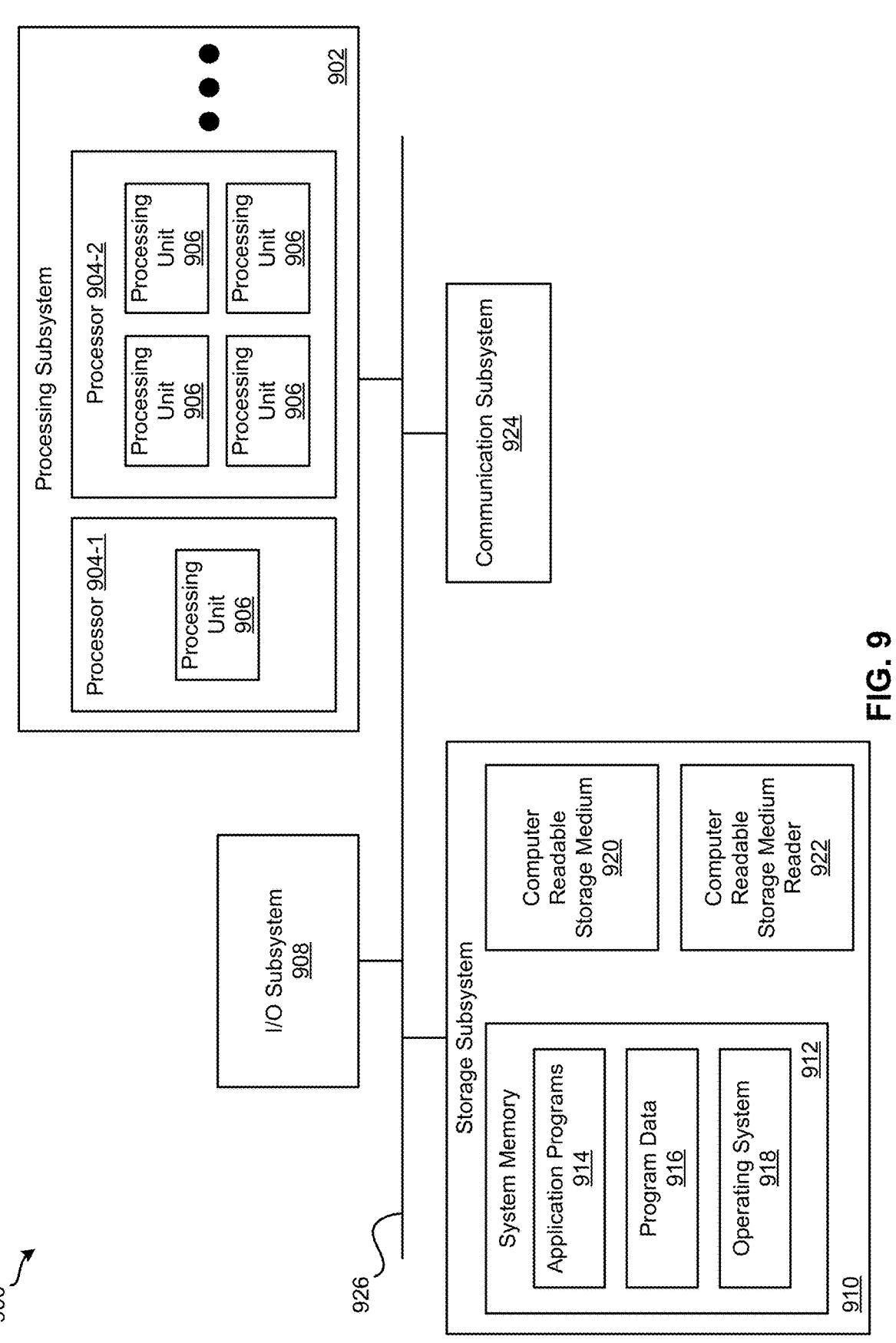
FIG. 9 illustrates an exemplary computer system, in which various embodiments may be implemented.

FIG. 9 illustrates an exemplary computer system 900 for implementing various embodiments described above. For example, computer system 900 may be used to implement client device 105 and computing system 125. Computer system 900 may be a desktop computer, a laptop, a server computer, or any other type of computer system or combination thereof. Some or all elements of UI manager 110, data manager 115, application 130, query processor 135, or combinations thereof can be included or implemented in computer system 900. In addition, computer system 900 can implement many of the operations, methods, and/or processes described above (e.g., process 800). As shown in FIG. 9, computer system 900 includes processing subsystem 902, which communicates, via bus subsystem 926, with input/output (I/O) subsystem 908, storage subsystem 910 and communication subsystem 924.

Bus subsystem 926 is configured to facilitate communication among the various components and subsystems of computer system 900. While bus subsystem 926 is illustrated in FIG. 9 as a single bus, one of ordinary skill in the art will understand that bus subsystem 926 may be implemented as multiple buses. Bus subsystem 926 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Extended ISA (EISA) bus, a Video Electronics Standards Association (VESA) local bus, a Peripheral Component Interconnect (PCI) bus, a Universal Serial Bus (USB), etc.

Processing subsystem 902, which can be implemented as one or more integrated circuits (e.g., a conventional microprocessor or microcontroller), controls the operation of computer system 900. Processing subsystem 902 may include one or more processors 904. Each processor 904 may include one processing unit 906 (e.g., a single core processor such as processor 904-1) or several processing units 906 (e.g., a multicore processor such as processor 904-2). In some embodiments, processors 904 of processing subsystem 902 may be implemented as independent processors while, in other embodiments, processors 904 of processing subsystem 902 may be implemented as multiple processors integrate into a single chip or multiple chips. Still, in some embodiments, processors 904 of processing subsystem 902 may be implemented as a combination of independent processors and multiple processors integrated into a single chip or multiple chips.

In some embodiments, processing subsystem 902 can execute a variety of programs or processes in response to program code and can maintain multiple concurrently executing programs or processes. At any given time, some or all of the program code to be executed can reside in processing subsystem 902 and/or in storage subsystem 910. Through suitable programming, processing subsystem 902 can provide various functionalities, such as the functionalities described above by reference to process 800.

I/O subsystem 908 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 900 to a user or another device (e.g., a printer).

As illustrated in FIG. 9, storage subsystem 910 includes system memory 912, computer-readable storage medium 920, and computer-readable storage medium reader 922. System memory 912 may be configured to store software in the form of program instructions that are loadable and executable by processing subsystem 902 as well as data generated during the execution of program instructions. In some embodiments, system memory 912 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 912 may include different types of memory, such as static random access memory (SRAM) and/or dynamic random access memory (DRAM). System memory 912 may include a basic input/output system (BIOS), in some embodiments, that is configured to store basic routines to facilitate transferring information between elements within computer system 900 (e.g., during start-up). Such a BIOS may be stored in ROM (e.g., a ROM chip), flash memory, or any other type of memory that may be configured to store the BIOS.

As shown in FIG. 9, system memory 912 includes application programs 914 (e.g., application 130), program data 916, and operating system (OS) 918. OS 918 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple IOS, Windows Phone, Windows Mobile, Android, BlackBerry OS, Blackberry 10, and Palm OS, WebOS operating systems.

Computer-readable storage medium 920 may be a non-transitory computer-readable medium configured to store software (e.g., programs, code modules, data constructs, instructions, etc.). Many of the components (e.g., UI manager 110, data manager 115, application 130, and query processor 135) and/or processes (e.g., process 800) described above may be implemented as software that when executed by a processor or processing unit (e.g., a processor or processing unit of processing subsystem 902) performs the operations of such components and/or processes. Storage subsystem 910 may also store data used for, or generated during, the execution of the software.

Storage subsystem 910 may also include computer-readable storage medium reader 922 that is configured to communicate with computer-readable storage medium 920. Together and, optionally, in combination with system memory 912, computer-readable storage medium 920 may comprehensively represent remote, local, fixed, and/or removable storage devices plus storage media for temporarily and/or more permanently containing, storing, transmitting, and retrieving computer-readable information.

Computer-readable storage medium 920 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSDs), flash memory card (e.g., secure digital (SD) cards, CompactFlash cards, etc.), USB flash drives, or any other type of computer-readable storage media or device.

Communication subsystem 924 serves as an interface for receiving data from, and transmitting data to, other devices, computer systems, and networks. For example, communication subsystem 924 may allow computer system 900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 924 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 924 may provide components configured for wired communication (e.g., Ethernet) in addition to or instead of components configured for wireless communication.

One of ordinary skill in the art will realize that the architecture shown in FIG. 9 is only an example architecture of computer system 900, and that computer system 900 may have additional or fewer components than shown, or a different configuration of components. The various components shown in FIG. 9 may be implemented in hardware, software, firmware or any combination thereof, including one or more signal processing and/or application specific integrated circuits.

Figure 10:
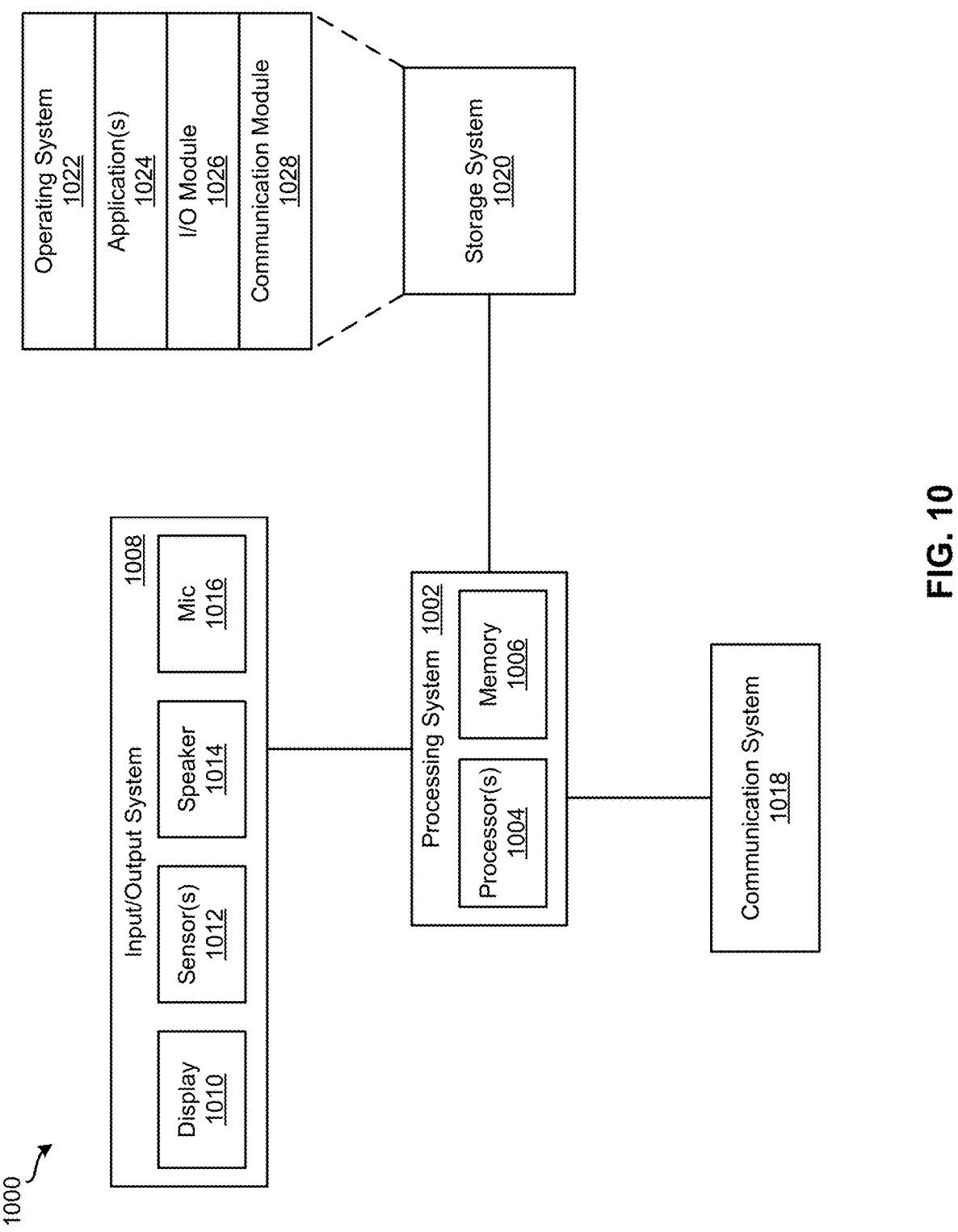
FIG. 10 illustrates an exemplary computing device, in which various embodiments may be implemented.

FIG. 10 illustrates an exemplary computing device 1000 for implementing various embodiments described above. For example, computing device 1000 may be used to implement client device 105. Computing device 1000 may be a cellphone, a smartphone, a wearable device, an activity tracker or manager, a tablet, a personal digital assistant (PDA), a media player, or any other type of mobile computing device or combination thereof. Some or all elements of UI manager 110, data manager 115, or combinations thereof can be included or implemented in computing device 1000. In addition, computing device 1000 can implement many of the operations, methods, and/or processes described above (e.g., process 800). As shown in FIG. 10, computing device 1000 includes processing system 1002, input/output (I/O) system 1008, communication system 1018, and storage system 1020. These components may be coupled by one or more communication buses or signal lines.

Processing system 1002, which can be implemented as one or more integrated circuits (e.g., a conventional microprocessor or microcontroller), controls the operation of computing device 1000. As shown, processing system 1002 includes one or more processors 1004 and memory 1006. Processors 1004 are configured to run or execute various software and/or sets of instructions stored in memory 1006 to perform various functions for computing device 1000 and to process data.

Each processor of processors 1004 may include one processing unit (e.g., a single core processor) or several processing units (e.g., a multicore processor). In some embodiments, processors 1004 of processing system 1002 may be implemented as independent processors while, in other embodiments, processors 1004 of processing system 1002 may be implemented as multiple processors integrated into a single chip. Still, in some embodiments, processors 1004 of processing system 1002 may be implemented as a combination of independent processors and multiple processors integrated into a single chip.

Memory 1006 may be configured to receive and store software (e.g., operating system 1022, applications 1024, I/O module 1026, communication module 1028, etc. from storage system 1020) in the form of program instructions that are loadable and executable by processors 1004 as well as data generated during the execution of program instructions. In some embodiments, memory 1006 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1008 is responsible for receiving input through various components and providing output through various components. As shown for this example, I/O system 1008 includes display 1010, one or more sensors 1012, speaker 1014, and microphone 1016. Display 1010 is configured to output visual information (e.g., a graphical user interface (GUI) generated and/or rendered by processors 1004). In some embodiments, display 1010 is a touch screen that is configured to also receive touch-based input. Display 1010 may be implemented using liquid crystal display (LCD) technology, light-emitting diode (LED) technology, organic LED (OLED) technology, organic electro luminescence (OEL) technology, or any other type of display technologies. Sensors 1012 may include any number of different types of sensors for measuring a physical quantity (e.g., temperature, force, pressure, acceleration, orientation, light, radiation, etc.). Speaker 1014 is configured to output audio information and microphone 1016 is configured to receive audio input. One of ordinary skill in the art will appreciate that I/O system 1008 may include any number of additional, fewer, and/or different components. For instance, I/O system 1008 may include a keypad or key board for receiving input, a port for transmitting data, receiving data and/or power, and/or communicating with another device or component, an image capture component for capturing photos and/or videos, etc.

Communication system 1018 serves as an interface for receiving data from, and transmitting data to, other devices, computer systems, and networks. For example, communication system 1018 may allow computing device 1000 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1018 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1018 may provide components configured for wired communication (e.g., Ethernet) in addition to or instead of components configured for wireless communication.

Storage system 1020 handles the storage and management of data for computing device 1000. Storage system 1020 may be implemented by one or more non-transitory machine-readable mediums that are configured to store software (e.g., programs, code modules, data constructs, instructions, etc.) and store data used for, or generated during, the execution of the software. Many of the components (e.g., UI manager 110 and data manager 115) and/or processes (e.g., process 800) described above may be implemented as software that when executed by a processor or processing unit (e.g., processors 1004 of processing system 1002) performs the operations of such components and/or processes.

In this example, storage system 1020 includes operating system 1022, one or more applications 1024, I/O module 1026, and communication module 1028. Operating system 1022 includes various procedures, sets of instructions, software components and/or drivers for controlling and managing general system tasks (e.g., memory management, storage device control, power management, etc.) and facilitates communication between various hardware and software components. Operating system 1022 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple IOS, Windows Phone, Windows Mobile, Android, BlackBerry OS, Blackberry 10, and Palm OS, WebOS operating systems.

Applications 1024 can include any number of different applications installed on computing device 1000. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1026 manages information received via input components (e.g., display 1010, sensors 1012, and microphone 1016) and information to be outputted via output components (e.g., display 1010) and speaker 1014). Communication module 1028 facilitates communication with other devices via communication system 1018 and includes various software components for handling data received from communication system 1018.

One of ordinary skill in the art will realize that the architecture shown in FIG. 10 is only an example architecture of computing device 1000, and that computing device 1000 may have additional or fewer components than shown, or a different configuration of components. The various components shown in FIG. 10 may be implemented in hardware, software, firmware or any combination thereof, including one or more signal processing and/or application specific integrated circuits.

Figure 11:
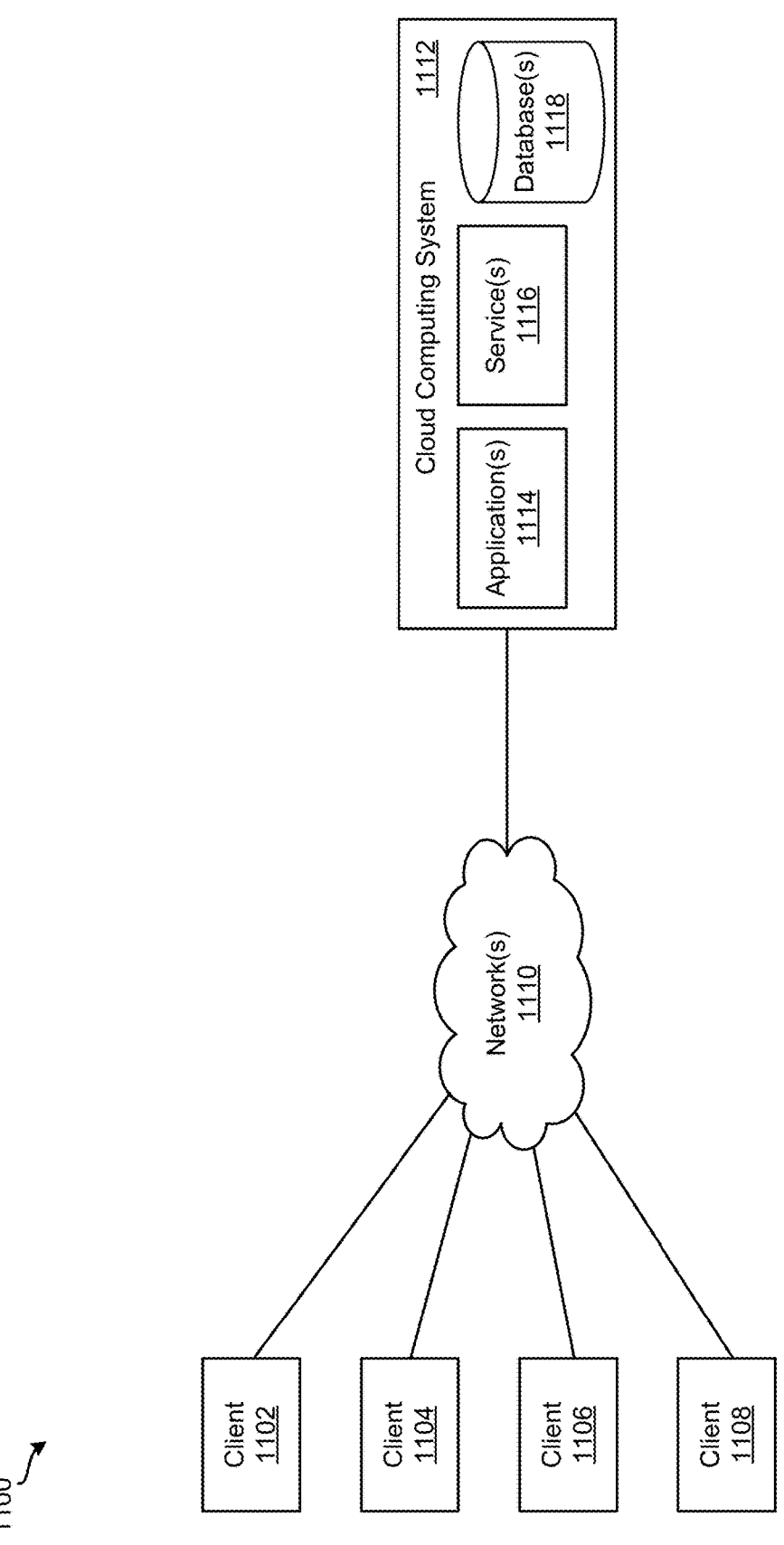
FIG. 11 illustrates an exemplary system, in which various embodiments may be implemented.

FIG. 11 illustrates an exemplary system 1100 for implementing various embodiments described above. For example, any of client devices 1102-1108 may be used to implement client device 105 and cloud computing system 1112 may be used to implement computing system 125. As shown, system 1100 includes client devices 1102-1108, one or more networks 1110, and cloud computing system 1112. Cloud computing system 1112 is configured to provide resources and data to client devices 1102-1108 via networks 1110. In some embodiments, cloud computing system 1112 provides resources to any number of different users (e.g., customers, tenants, organizations, etc.). Cloud computing system 1112 may be implemented by one or more computer systems (e.g., servers), virtual machines operating on a computer system, or a combination thereof.

As shown, cloud computing system 1112 includes one or more applications 1114, one or more services 1116, and one or more databases 1118. Cloud computing system 1112 may provide applications 1114, services 1116, and databases 1118 to any number of different customers in a self-service, subscription-based, elastically scalable, reliable, highly available, and secure manner.

In some embodiments, cloud computing system 1112 may be adapted to automatically provision, manage, and track a customer's subscriptions to services offered by cloud computing system 1112. Cloud computing system 1112 may provide cloud services via different deployment models. For example, cloud services may be provided under a public cloud model in which cloud computing system 1112 is owned by an organization selling cloud services and the cloud services are made available to the general public or different industry enterprises. As another example, cloud services may be provided under a private cloud model in which cloud computing system 1112 is operated solely for a single organization and may provide cloud services for one or more entities within the organization. The cloud services may also be provided under a community cloud model in which cloud computing system 1112 and the cloud services provided by cloud computing system 1112 are shared by several organizations in a related community. The cloud services may also be provided under a hybrid cloud model, which is a combination of two or more of the aforementioned different models.

In some instances, any one of applications 1114, services 1116, and databases 1118 made available to client devices 1102-1108 via networks 1110 from cloud computing system 1112 is referred to as a "cloud service." Typically, servers and systems that make up cloud computing system 1112 are different from the on-premises servers and systems of a customer. For example, cloud computing system 1112 may host an application and a user of one of client devices 1102-1108 may order and use the application via networks 1110.

Applications 1114 may include software applications that are configured to execute on cloud computing system 1112 (e.g., a computer system or a virtual machine operating on a computer system) and be accessed, controlled, managed, etc. via client devices 1102-1108. In some embodiments, applications 1114 may include server applications and/or mid-tier applications (e.g., HTTP (hypertext transfer protocol) server applications, FTP (file transfer protocol) server applications, CGI (common gateway interface) server applications, JAVA server applications, etc.). Services 1116 are software components, modules, application, etc. that are configured to execute on cloud computing system 1112 and provide functionalities to client devices 1102-1108 via networks 1110. Services 1116 may be web-based services or on-demand cloud services.

Databases 1118 are configured to store and/or manage data that is accessed by applications 1114, services 1116, and/or client devices 1102-1108. For instance, storages 140 and 145 may be stored in databases 1118. Databases 1118 may reside on a non-transitory storage medium local to (and/or resident in) cloud computing system 1112, in a storage-area network (SAN), on a non-transitory storage medium local located remotely from cloud computing system 1112. In some embodiments, databases 1118 may include relational databases that are managed by a relational database management system (RDBMS). Databases 1118 may be a column-oriented databases, row-oriented databases, or a combination thereof. In some embodiments, some or all of databases 1118 are in-memory databases. That is, in some such embodiments, data for databases 1118 are stored and managed in memory (e.g., random access memory (RAM)).

Client devices 1102-1108 are configured to execute and operate a client application (e.g., a web browser, a proprietary client application, etc.) that communicates with applications 1114, services 1116, and/or databases 1118 via networks 1110. This way, client devices 1102-1108 may access the various functionalities provided by applications 1114, services 1116, and databases 1118 while applications 1114, services 1116, and databases 1118 are operating (e.g., hosted) on cloud computing system 1112. Client devices 1102-1108 may be computer system 900 or computing device 1000, as described above by reference to FIGS. 9 and 10, respectively. Although system 1100 is shown with four client devices, any number of client devices may be supported.

Networks 1110 may be any type of network configured to facilitate data communications among client devices 1102-1108 and cloud computing system 1112 using any of a variety of network protocols. Networks 1110 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:

receiving a first selection of a data model as a data source for a visualization, wherein the data model specifies data to be organized according to a set of measures and a set of dimensions, wherein a measure stores quantitative data and a dimension stores qualitative data;

receiving a second selection of a dimension value for a dimension in the set of dimensions, wherein each measure in the set of measures corresponds to a distinct one of a plurality of possible dimension values for the dimension;

in response to the second selection, generating a state representation of the visualization that includes the selected dimension value for the dimension, wherein the state representation of the visualization is retrieved from a universal state of representations stored locally in a client device, or when not stored locally, generated using a query to obtain underlying data, wherein the state representation of the visualization comprises a data structure that represents a state of a visualization in terms of data to be used to render the visualization; and generating the visualization based on the state representation of the visualization.

2. The non-transitory machine-readable medium of claim 1, wherein the generated visualization includes measure values for a measure in the set of measures that corresponds to the selected dimension value for the dimension.

3. The non-transitory machine-readable medium of claim 1, wherein the program further comprises sets of instructions for:

receiving a third selection of a dimension value for a second dimension in the set of dimensions, wherein each measure in a second set of measures of the data model is a particular dimension value for the second dimension; and in response to the third selection, updating the state representation of the visualization to further include the selected dimension value for the second dimension.

4. The non-transitory machine-readable medium of claim 1, wherein generating the visualization based on the state representation of the visualization comprises:

generating a query based on the state representation;

sending the query to a computing system;

receiving, from the computing system, a result set of data for the query; and rendering the visualization to include the result set of data.

5. The non-transitory machine-readable medium of claim 1, wherein the program further comprises sets of instructions for:

receiving a third selection of the visualization;

in response to receiving the third selection, generating a tool for building the visualization based on the state representation of the visualization; and providing the tool in a graphical user interface (GUI).

6. The non-transitory machine-readable medium of claim 1, wherein the data model is a first data model, wherein the data source for the visualization is a first data source for a first visualization, wherein the data is a first data, wherein the set of measures is a first set of measures, wherein the set of dimensions is a first set of dimensions, wherein the state representation is a first state representation, wherein the program further comprises sets of instructions for:

receiving a third selection of a second data model as a second data source for a second visualization, wherein the second data model specifies data to be organized according to a second set of measures and a second set of dimensions;

receiving a fourth selection of a dimension value for a dimension in the second set of dimensions, wherein each measure in the second set of measures is a particular dimension value for the dimension in the second set of dimensions;

in response to the fourth selection, generating a second state representation of the second visualization that includes the selected dimension value for the dimension in the second set of dimensions; and generating the second visualization based on the second state representation of the second visualization.

7. The non-transitory machine-readable medium of claim 6, wherein a first structure of the first state representation for the first visualization and a second structure of the second state representation for the second visualization are the same.

8. A method comprising:

receiving a first selection of a data model as a data source for a visualization, wherein the data model specifies data to be organized according to a set of measures and a set of dimensions, wherein a measure stores quantitative data and a dimension stores qualitative data;

receiving a second selection of a dimension value for a dimension in the set of dimensions, wherein each measure in the set of measures corresponds to a distinct one of a plurality of possible dimension values for the dimension;

in response to the second selection, generating a state representation of the visualization that includes the selected dimension value for the dimension, wherein the state representation of the visualization is retrieved from a universal state of representations stored locally in a client device, or when not stored locally, generated using a query to obtain underlying data, wherein the state representation of the visualization comprises a data structure that represents a state of a visualization in terms of data to be used to render the visualization; and generating the visualization based on the state representation of the visualization.

9. The method of claim 8, wherein the generated visualization includes measure values for a measure in the set of measures that corresponds to the selected dimension value for the dimension.

10. The method of claim 8 further comprising:

receiving a third selection of a dimension value for a second dimension in the set of dimensions, wherein each measure in a second set of measures of the data model is a particular dimension value for the second dimension; and in response to the third selection, updating the state representation of the visualization to further include the selected dimension value for the second dimension.

11. The method of claim 8, wherein generating the visualization based on the state representation of the visualization comprises:

generating a query based on the state representation;

sending the query to a computing system;

receiving, from the computing system, a result set of data for the query; and rendering the visualization to include the result set of data.

12. The method of claim 8 further comprising:

receiving a third selection of the visualization;

in response to receiving the third selection, generating a tool for building the visualization based on the state representation of the visualization; and providing the tool in a graphical user interface (GUI).

13. The method of claim 8 wherein the data model is a first data model, wherein the data model is a first data model, wherein the data source for the visualization is a first data source for a first visualization, wherein the data is a first data, wherein the set of measures is a first set of measures, wherein the set of dimensions is a first set of dimensions, wherein the state representation is a first state representation, the method further comprising:

receiving a third selection of a second data model as a second data source for a second visualization, wherein the second data model specifies data to be organized according to a second set of measures and a second set of dimensions;

receiving a fourth selection of a dimension value for a dimension in the second set of dimensions, wherein each measure in the second set of measures is a particular dimension value for the dimension in the second set of dimensions;

in response to the fourth selection, generating a second state representation of the second visualization that includes the selected dimension value for the dimension in the second set of dimensions; and generating the second visualization based on the second state representation of the second visualization.

14. The method of claim 13, wherein a first structure of the first state representation for the first visualization and a second structure of the second state representation for the second visualization are the same.

15. A system comprising:

a set of processing units; and a non-transitory machine-readable medium storing instructions that when executed by at least one processing unit in the set of processing units cause the at least one processing unit to:

receive a first selection of a data model as a data source for a visualization, wherein the data model specifies data to be organized according to a set of measures and a set of dimensions, wherein a measure stores quantitative data and a dimension stores qualitative data;

receive a second selection of a dimension value for a dimension in the set of dimensions, wherein each measure in the set of measures corresponds to a distinct one of a plurality of possible dimension values for the dimension;

in response to the second selection, generate a state representation of the visualization that includes the selected dimension value for the dimension, wherein the state representation of the visualization is retrieved from a universal state of representations stored locally in a client device, or if not stored locally, generated using a query to obtain underlying data, wherein the state representation of the visualization comprises a data structure that represents a state of a visualization in terms of data to be used to render the visualization; and generate the visualization based on the state representation of the visualization.

16. The system of claim 15, wherein the generated visualization includes measure values for a measure in the set of measures that corresponds to the selected dimension value for the dimension.

17. The system of claim 15, wherein the instructions further cause the at least one processing unit to:

receive a third selection of a dimension value for a second dimension in the set of dimensions, wherein each measure in a second set of measures of the data model is a particular dimension value for the second dimension; and in response to the third selection, update the state representation of the visualization to further include the selected dimension value for the second dimension.

18. The system of claim 15, wherein generating the visualization based on the state representation of the visualization comprises:

generating a query based on the state representation;

sending the query to a computing system;

receiving, from the computing system, a result set of data for the query; and rendering the visualization to include the result set of data.

19. The system of claim 15, wherein the instructions further cause the at least one processing unit to:

receive a third selection of the visualization;

in response to receiving the third selection, generate a tool for building the visualization based on the state representation of the visualization; and provide the tool in a graphical user interface (GUI).

20. The system of claim 15, wherein the data model is a first data model, wherein the data source for the visualization is a first data source for a first visualization, wherein the data is a first data, wherein the set of measures is a first set of measures, wherein the set of dimensions is a first set of dimensions, wherein the state representation is a first state representation, wherein the instructions further cause the at least one processing unit to:

receive a third selection of a second data model as a second data source for a second visualization, wherein the second data model specifies data to be organized according to a second set of measures and a second set of dimensions;

receive a fourth selection of a dimension value for a dimension in the second set of dimensions, wherein each measure in the second set of measures is a particular dimension value for the dimension in the second set of dimensions;

in response to the fourth selection, generate a second state representation of the second visualization that includes the selected dimension value for the dimension in the second set of dimensions; and generate the second visualization based on the second state representation of the second visualization.

* * * * *